United States Patent
Shirai (10) Patent No.: US 10,694,553 B2
(45) Date of Patent: Jun. 23, 2020

(54) CONNECTION METHOD OF COMMUNICATION DEVICE AND THE COMMUNICATION DEVICE

(71) Applicant: YAMAHA CORPORATION, Hamamatsu-shi (JP)

(72) Inventor: Masakazu Shirai, Toyohashi (JP)

(73) Assignee: YAMAHA CORPORATION, Hamamatsu-shi (JP)

(*) Notice: Subject to any disclaimer, the term of this patent is extended or adjusted under 35 U.S.C. 154(b) by 81 days.

(21) Appl. No.: 15/805,643

(22) Filed: Nov. 7, 2017

(65) Prior Publication Data

US 2018/0070392 A1     Mar. 8, 2018

Related U.S. Application Data

(63) Continuation of application No. PCT/JP2016/074216, filed on Aug. 19, 2016.

(30) Foreign Application Priority Data

Aug. 19, 2015   (JP) .................................. 2015-162332

(51) Int. Cl.
    *H04W 76/10*     (2018.01)
    *H04W 76/20*     (2018.01)
    (Continued)

(52) U.S. Cl.
    CPC ........... *H04W 76/10* (2018.02); *H04W 36/26* (2013.01); *H04W 40/02* (2013.01);
    (Continued)

(58) Field of Classification Search
    CPC ... H04W 76/10; H04W 40/02; H04W 40/246; H04W 40/34; H04W 36/165; H04W 48/12; H04W 84/12; H04W 84/18; H04W 88/08
    See application file for complete search history.

(56) References Cited

U.S. PATENT DOCUMENTS

2005/0152305 A1*  7/2005  Ji ........................... H04L 45/54
                                                              370/328
2006/0034235 A1   2/2006  Yamane
                        (Continued)

FOREIGN PATENT DOCUMENTS

JP     2003101546 A    4/2003
JP     2006081164 A    3/2006

OTHER PUBLICATIONS

English translation of Written Opinion issued in International Application No. PCT/JP2016/074216 dated Oct. 25, 2016, previously cited in IDS filed Nov. 7, 2017.
(Continued)

*Primary Examiner* — Michael Thier
*Assistant Examiner* — Brian P Cox
(74) *Attorney, Agent, or Firm* — Rossi, Kimms & McDowell LLP (57) ABSTRACT

A connection method of a communication device in a communication system is provided. The communication system includes a plurality of communication devices each having a wireless LAN (Local Area Network) access point function and a wireless LAN child device function and is constructed by connecting a lower-level communication device to an access point of a higher-level communication device. A new communication device is to be added to the communication system executes: a first step of connecting to an access point of an arbitrary one of the plurality of communication devices of the communication system; and a second step of acquiring, from the connected communication device, system information of the communication system including a connection form of the plurality of communication devices.

6 Claims, 9 Drawing Sheets

(51) Int. Cl.
*H04W 40/02* (2009.01)
*H04W 40/24* (2009.01)
*H04W 36/26* (2009.01)
*H04W 40/34* (2009.01)
*H04W 84/12* (2009.01)
*H04W 84/18* (2009.01)
*H04W 48/12* (2009.01)
*H04W 88/08* (2009.01)

(52) U.S. Cl.
CPC ......... *H04W 40/246* (2013.01); *H04W 40/34* (2013.01); *H04W 48/12* (2013.01); *H04W 84/12* (2013.01); *H04W 84/18* (2013.01); *H04W 88/08* (2013.01)

(56) References Cited

U.S. PATENT DOCUMENTS

| | | | |
|---|---|---|---|
| 2009/0116411 A1 | 5/2009 | Castagnoli et al. | |
| 2013/0173794 A1* | 7/2013 | Agerbak | H04N 21/43615 709/225 |
| 2014/0098713 A1* | 4/2014 | Beckhardt | H04N 21/42684 370/256 |
| 2016/0277969 A1* | 9/2016 | Iyer | H04W 48/06 |
| 2016/0337190 A1* | 11/2016 | Wachter | H04W 76/10 |
| 2018/0063714 A1* | 3/2018 | Stephenson | H04W 12/06 |

OTHER PUBLICATIONS

European Search Report issued in European Appln. No. 16837174.8 dated Jan. 29, 2019.

Symbol Technologies "AP-5131 Access Point Product Reference Guide" Symbol the Enterprise Mobility Company. 72E-94168-01 Revision A. Nov. 2006: 1-79. Cited in NPL 1 and 3.

Office Action issued in European Appln. No. 16837174.8 dated Feb. 5, 2019.

International Search Report issued in International Application No. PCT/JP2016/074216 dated Oct. 25, 2016. English translation provided.

Written Opinion issued in International Application No. PCT/JP2016/074216 dated Oct. 25, 2016.

Office Action issued in European Appln. No. 16837174.8 dated Oct. 4, 2019.

* cited by examiner

CONNECTION METHOD OF COMMUNICATION DEVICE AND THE COMMUNICATION DEVICE

CROSS REFERENCE TO RELATED APPLICATIONS

This application is a continuation of PCT application No. PCT/JP2016/074216, which was filed on Aug. 19, 2016 based on Japanese Patent Application (No. 2015-162332) filed on Aug. 19, 2015, the contents of which are incorporated herein by reference.

BACKGROUND OF THE INVENTION

1. Field of the Invention

This disclosure relates to a network-connected audio system (communication system) and, more particularly, to an audio device (communication device) connection method for connecting an audio device (communication device) to a network efficiently as well as to an audio device (communication device).

2. Description of the Related Art

Conventionally, in audio systems including plurality of audio devices, the audio devices are connected to each other by analog or digital audio cables. In recent years, to eliminate cumbersome cables and increase the degree of freedom of the manner of connection, it has been considered to connect respective devices to each other by a network (in particular, a wireless network) and exchange audio signals and command messages in the form of packets.

Although an audio cable is necessary for every input or output terminal, connection is completed by connecting an audio cable physically to a terminal of each device. In contrast, in the case of a wireless network, as disclosed in JP-A-2003-101546, setting of an SSID, a password, etc. is necessary and hence setting work is more complex than in the case of connection by a cable. Furthermore, to transmit a high-quality audio signal, a connection form capable of minimizing congestion of radio waves should be selected. However, it is troublesome for a user to select such a connection form.

SUMMARY OF THE INVENTION

An object of the disclosure is therefore to provide a configuration capable of connecting a communication device to a network easily and efficiently.

Means for Solving the Problem (1) This disclosure provides a connection method of a communication device in a communication system that includes a plurality of communication devices each having a wireless LAN (Local Area Network) access point function and a wireless LAN child device function and is constructed by connecting a lower-level communication device to an access point of a higher-level communication device, wherein:
a new communication device to be added to the communication system executes:
a first step of connecting to an access point of an arbitrary one of the plurality of communication devices of the communication system; and
a second step of acquiring, from the connected communication device, system information of the communication system including a connection form of the plurality of communication devices.

(2) This disclosure also provides a communication device of a communication system that includes a plurality of communication devices each having a wireless LAN (Local Area Network) access point function and a wireless LAN child device function and is constructed by connecting a lower-level communication device to an access point of a higher-level communication device, the communication device comprising:
a wireless network communication unit that communicates with another communication device in the communication system over a wireless network;
a communication processing unit that processes a communication signal received from the wireless network; and
a control unit, wherein:
the control unit makes connection to an arbitrary access point by searching the wireless network, acquires connection form of the plurality of communication devices in the wireless network from the connected access point, and changes a connection destination thereof to another access point based on the acquired connection form.

Advantages of the Invention

This disclosure makes it possible to connect a new communication device to a network easily in an efficient form.

DETAILED DESCRIPTION OF THE EXEMPLARY EMBODIMENTS

Figure 1:
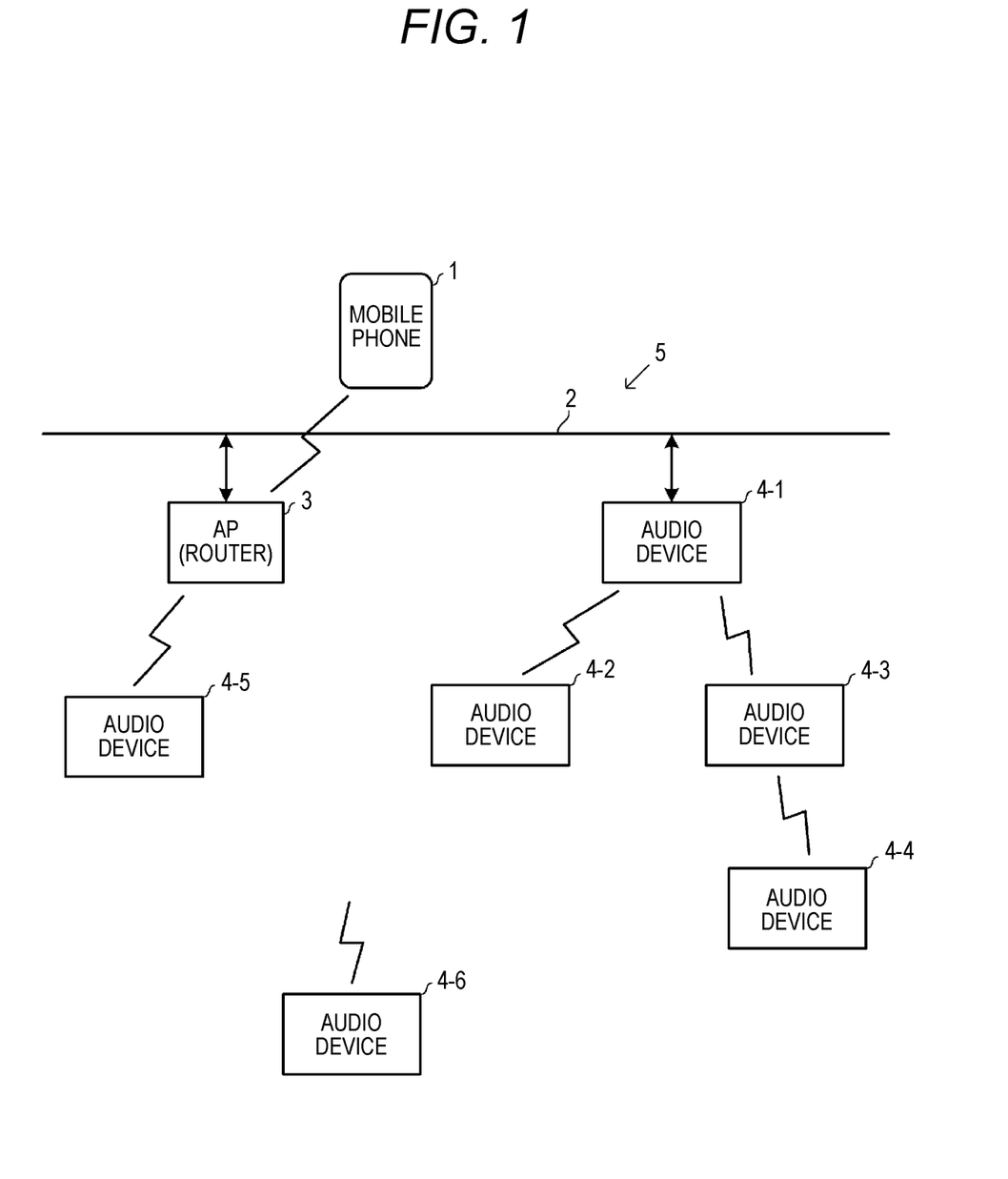
FIG. 1 is a diagram showing the configuration of an audio system to which this disclosure is applied.

FIG. 1 is a diagram showing the configuration of an audio system to which this disclosure is applied. In this audio system, a plurality of audio devices 4 and a multifunction mobile phone (hereinafter referred to as a mobile phone) 1 which functions as a controller are connected to each other by a network 5 (a wired LAN 2 and a wireless LAN) and audio signals and command messages are exchanged between them mutually via the network 5. Thus, the audio system has the plurality of audio devices 4 (4-1 to 4-5) and the multifunction mobile phone 1 (which functions as a controller 1) which are connected to each other by the wired LAN 2 and the wireless LAN. For example, the wired LAN 2 is an Ethernet (registered trademark; IEEE 802.3) and the wireless LAN is Wi-Fi network (IEEE 802.11g). The audio devices 4 (4-1 to 4-5) are component devices as components of the audio system. An audio device 4-6 shown in FIG. 1 is a new audio device 4 to be added to this audio system. An operation that is performed in adding a new audio device to the audio system will be described later.

Each audio device 4 can activate an access point using one of two wireless LAN functions. An access point activated by an audio device 4 is called an internal access point 4A. Usually (i.e., in cases other than initial connection (described later)), the internal access point 4A operates in a stealth mode and hence other devices are hard to recognize its presence. The other wireless LAN function serves to allow the audio device 4 to function as a child device of the wireless LAN and is connected to one access point.

Each audio device 4 is called a root device, a node device, a leaf device, or a branch device according to its form of connection to the wired LAN 2. The root device means a highest-level device that is connected to the wired LAN 2 by a cable. In FIG. 1, the audio device 4-1 is a root device. The root device activates an internal access point 4A for connecting other audio device to the network 5 using the wireless LAN function.

The node device means a medium-level device that is connected to the root device (the internal access point 4A of the root device) by the wireless LAN. In FIG. 1, the audio device 4-2 and 4-3 are node devices. Each node device activates an internal access point 4A for connecting other audio device to the network 5 using the wireless LAN function.

The leaf device means a low-level device that is connected to a node device (the access point 4A of a node device) by the wireless LAN. In FIG. 1, the audio device 4-4 is a leaf device.

In this audio system, for transmission of high-quality audio signals, connection of up to two node devices to the root device is permitted. And connection of up to two leaf devices to each node device is permitted. Thus, up to seven audio devices including the root device can be connected in the form of a wireless LAN tree having the root device as the top. In FIG. 1, the two node devices 4-2 and 4-3 are already connected to the root device 4-1 and the one leaf device 4-4 is connected to the node device 4-3. The number of layers of a tree and the number of low-level device that can be connected to each audio device 4 are not limited to those of the embodiment. From the viewpoint of the function of the internal access point 4A, three or more low-level devices can be connected to each audio device 4.

An access point 3 is connected to the wired LAN 2. The access point 3 is also called an external access point. The branch device means a device that is connected to the access point 3 by the wireless LAN separately from the above-mentioned tree. The audio device 4-5 is a branch device. There are no limitations on the number of branch devices. Each of the above-mentioned tree-connected audio device 4 and the branch device 4-5 which is connected to the access point 3 can communicate with each other via the wired LAN 2. Neither the leaf device nor the branch device activates its internal access point 4A.

The mobile phone 1 functions as an audio system controller (hereinafter referred to as a controller) 1 when an audio system control program 70 (see FIG. 2) is activated.

The mobile phone 1 (controller 1) controls an audio source to be reproduced by the audio system, its volume, etc. via the network 5. The audio device 4 exchange audio signals with each other over the network 5.

Figure 2:
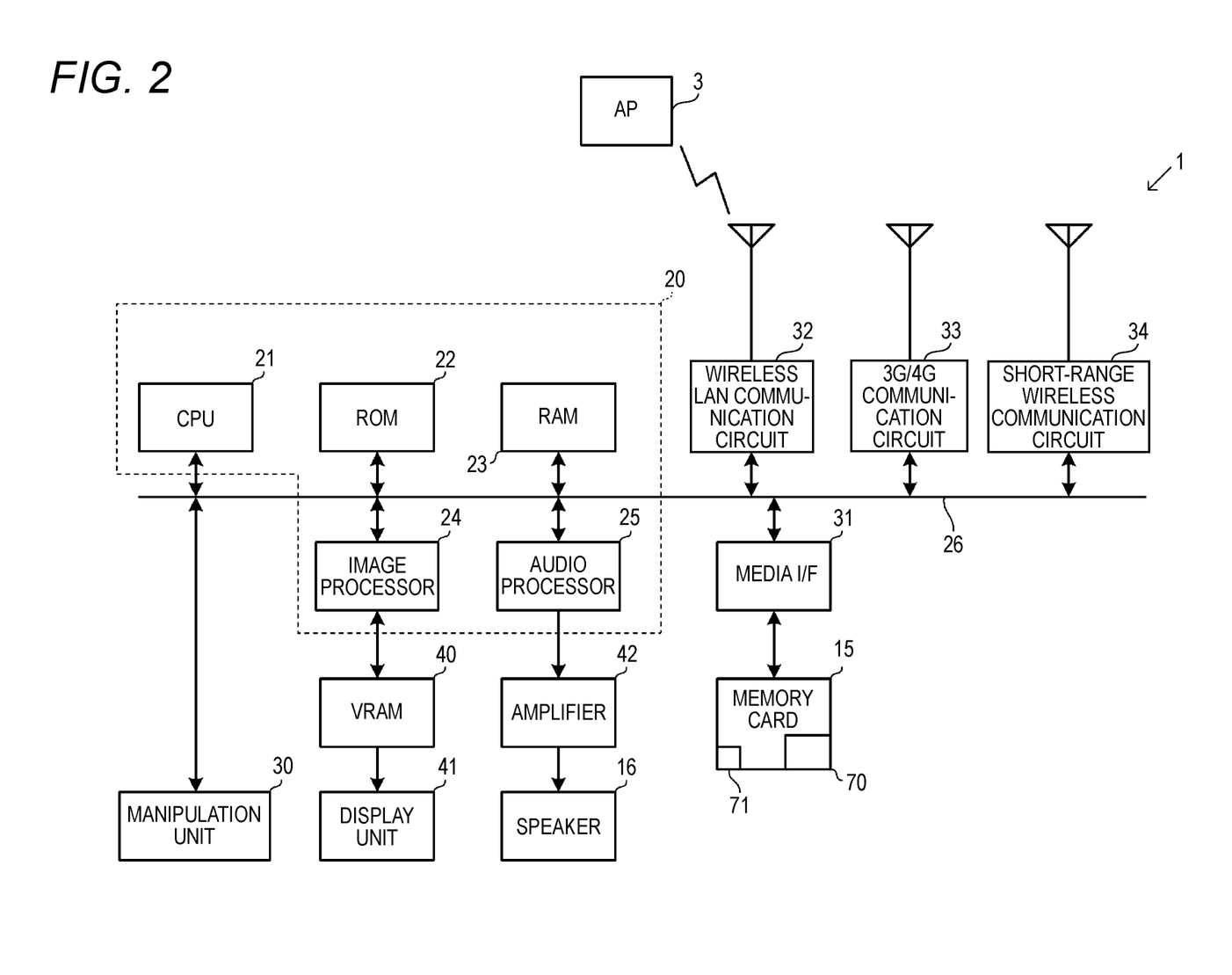
FIG. 2 is a block diagram of a mobile phone to which this disclosure is applied and which functions as a controller.

Next, the configuration of the mobile phone 1 will be described with reference to a block diagram of FIG. 2. The mobile phone 1 is a multifunction telephone, that is, what is called a smartphone. The mobile phone 1 has a 3G/4G communication function which is a mobile phone communication network function, a wireless LAN (Wi-Fi function) communication function, and a Bluetooth (registered trademark) communication function. When the audio system control program 70 which is an application program has been activated, the mobile phone 1 functions as the controller 1 and controls the audio system by communicating with the audio device 4 of the audio system over the network 5 and sending command messages corresponding to user manipulations to the audio device 4.

The mobile phone 1 is equipped with a control unit 20, a manipulation unit 30, a media interface 31, a wireless LAN communication circuit 32, a 3G/4G communication circuit 33, and a short-range wireless communication circuit 34 capable of performing a Bluetooth (registered trademark) communication, all of which are connected to a bus 26. The control unit 20 includes a CPU 21, a ROM (flash memory) 22, a RAM 23, an image processor 24, and an audio processor 25. A video RAM (VRAM) 40 is connected to the image processor 24, and a display unit 41 is connected to the VRAM 40. The display unit 41 includes a liquid crystal display. A standby picture, a telephone number, etc. are displayed on the display. When the mobile phone 1 functions as the controller 1, a picture for controlling the audio device 4 are displayed on the display. An amplifier 42 including a D/A converter is connected to the audio processor 25, and a speaker 16 is connected to the amplifier 42.

The image processor 24 is equipped with a GPU (graphics processing unit) for generating various images of a standby picture, a telephone number, etc. When the audio system control program 70 is activated, the image processor 24 generates an audio controller image according to an instruction from the CPU 21 and develops it on the VRAM 40. The image developed on the VRAM 40 is displayed on the display unit 41.

The audio processor 25 is equipped with a DSP (digital signal processor) for encoding and decoding a telephone voice. The audio processor 25 outputs a decoded or generated audio signal to the amplifier 41. The amplifier 42 amplifies this audio signal and outputs the amplified signal to the speaker 16.

The wireless LAN communication circuit 32 communicates with an audio device 4 via the access point 3 by performing a wireless communication with the access point 3 according to such a standard as IEEE 802.11g. The 3G/4G communication circuit 33 performs a voice telephone communication and a data communication over a mobile phone communication network. The short-range wireless communication circuit 34 exchanges, for example, audio signals with another Bluetooth (registered trademark)-compatible device by communicating with it.

The manipulation unit 30 includes a touch panel that is formed on the display unit 41, and detects a touch manipulation and a flick manipulation made on the touch panel. A memory card 15 is connected to the media interface 31. The memory card 15 is a micro SD card, for example. The audio system control program 70 is stored in the memory card 15 or the ROM 22. In the embodiment, it is assumed that as shown in FIG. 2 the audio system control program 70 is stored in the memory card 15. The audio system control program 70 may be either downloaded by a 3G/4G or non-LAN data communication or stored in the ROM 22 or the memory card 15 in advance. A storage area 71 for storing information indicating the configuration of the audio system is set in the memory card 15.

The ROM 22 is stored with a basic program that enables the mobile phone 1 to perform a telephone communication and run application programs. The ROM 22, which is a flash memory, can store downloaded application programs in addition to the basic program. A working area to be used when the CPU 20 runs the audio system control program 70 is set in the RAM 23.

Next, the configuration of each audio device 4 will be described with reference to FIG. 3. Each audio device 4 is equipped with not only a control unit 50, an audio processing unit 51, a manipulation unit 59 but also two wireless LAN communication units (RF modules) 56 and 57 and a wired LAN communication unit 58. The manipulation unit 59 has a connect button 59A. The control unit 50 includes a CPU and a memory and is stored with an audio system program 50A. The control unit 50 controls the operations of the audio processing unit 51, the wireless LAN communication units 56 and 57, and the wired LAN communication unit 58 using the audio system program 50A. When the connect button 59A is depressed, the control unit 50 performs an initial connection operation that is an operation for connecting the audio device 4 to the network 5. The details of the initial connection operation will be described later in detail.

The wireless LAN communication unit 56 performs a wireless communication with the access point 3 according to a wireless LAN standard such as IEEE 802.11g. The other wireless LAN communication unit 57 is activated as an access point (internal access point 4A), and relays a communication between another audio device (e.g., audio device 4-2 or 4-3) and the wired LAN 2. Also at the time of initial connection of this audio device 4, the wireless LAN communication unit 57 is activated as a temporary access point for initial connection and communicates with the controller 1 (mobile phone 1). An operation that is performed at the time of initial connection will be described later. The two wireless LAN communication units 56 and 57 may be implemented in such a manner that a single hardware unit operates in a time-divisional manner. The wired LAN communication unit 58 has a cable connector and performs a communication via the wired LAN 2 according to a communication standard such as IEEE 802.3. The controller 1, which is a mobile phone in terms of hardware, is connected to the access point 3, and the control unit 50 communicates with the controller 1 via the wired LAN 2 or the wireless LAN and thereby sends information indicating an operation state or receives a command message from it.

An SSID and a password of the internal access point 4A are character strings that can be inferred from a MAC address of the wireless LAN communication unit 57. For example, an octet representation of the MAC address is employed as the SSID and lowest three octets (type ID plus serial number) of the MAC address are employed as the password. With this measure, an audio device 4 that is going to newly join the audio system can find the internal access point 4A based on the SSID, that is, a vendor ID and a type ID of the MAC address, and connect to the internal access point 4A by generating the password on its own. This makes it possible to dispense with input of an SSID and a password by a user in making connection to the internal access point 4A. The method for generating an SSID and a password of the internal access point 4A is not limited to the above-described one.

The audio processing unit 51 is equipped with a tuner 52, an audio circuit 53, and a power amplifier 54. The tuner 52 receives an audio signal from an FM broadcasting station or the Internet and inputs it to the audio circuit 53. The audio circuit 53 performs such processing as equalization and volume adjustment on the received audio signal and outputs the processed audio signal to the power amplifier 54. The power amplifier 54 amplifies the received audio signal and outputs the amplified audio signal to a speaker 55 which is connected to the power amplifier 54 externally. The speaker 55 emits a sound corresponding to the received audio signal.

Figure 3:
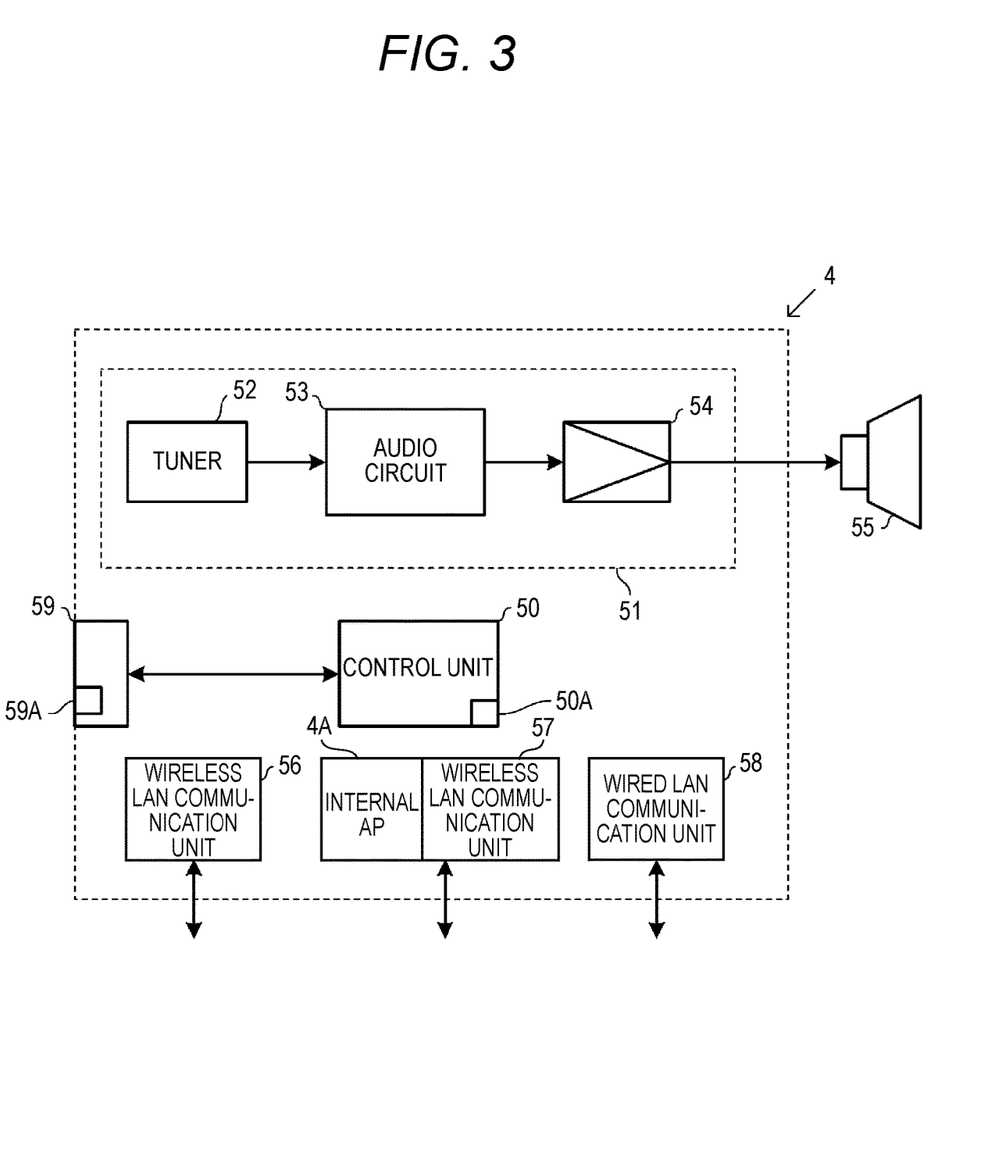
FIG. 3 is a block diagram of each audio device to which this disclosure is applied.

Although the audio device 4-1 to 4-6 may be different kinds of devices, their communication function and audio signal processing function should have the basic makeups shown in FIG. 3. For example, although in the audio device 4 shown in FIG. 3 the speaker 55 is provided outside the audio device 4, the audio device 4 may have such an integral configuration that a speaker is provided inside it. Furthermore, the audio processing unit 51 need not be equipped with all of the tuner 52, the audio circuit 53, and the power amplifier 54, and may be such that it is equipped with only part of them and the other units are connected to it externally.

Next, a process for network-connecting the audio device 4 of the audio system will be described with reference to FIGS. 4-9.

To construct the audio system, first, an audio device 4 that is connected to the wired LAN 2 by a cable is set as a root device 4-1 by communicating with the controller 1. Node devices 4-2 and 4-3 to be connected to the root device 4-1, a leaf device 4-4 to be connected to the node device 403, and other devices 4 are added thereafter. Once the root device 4-1 is installed, that is, once an audio system is constructed, a branch device 4-5 can be installed in a desired manner.

As described above, to transmit high-quality audio signals, connection of two or less node device 4-2 and/or 4-3 to the root device 4-1 is permitted and connection of two or less leaf device to each of the node device 4-2 and 4-3 is permitted. However, a node device performs both of an up-link communication and a down-link communication over the wireless LAN, its communication environment is not necessarily good. Thus, in adding a new audio device 4, another connection form is searched for so that it does not become a leaf device if possible.

Figure 4:
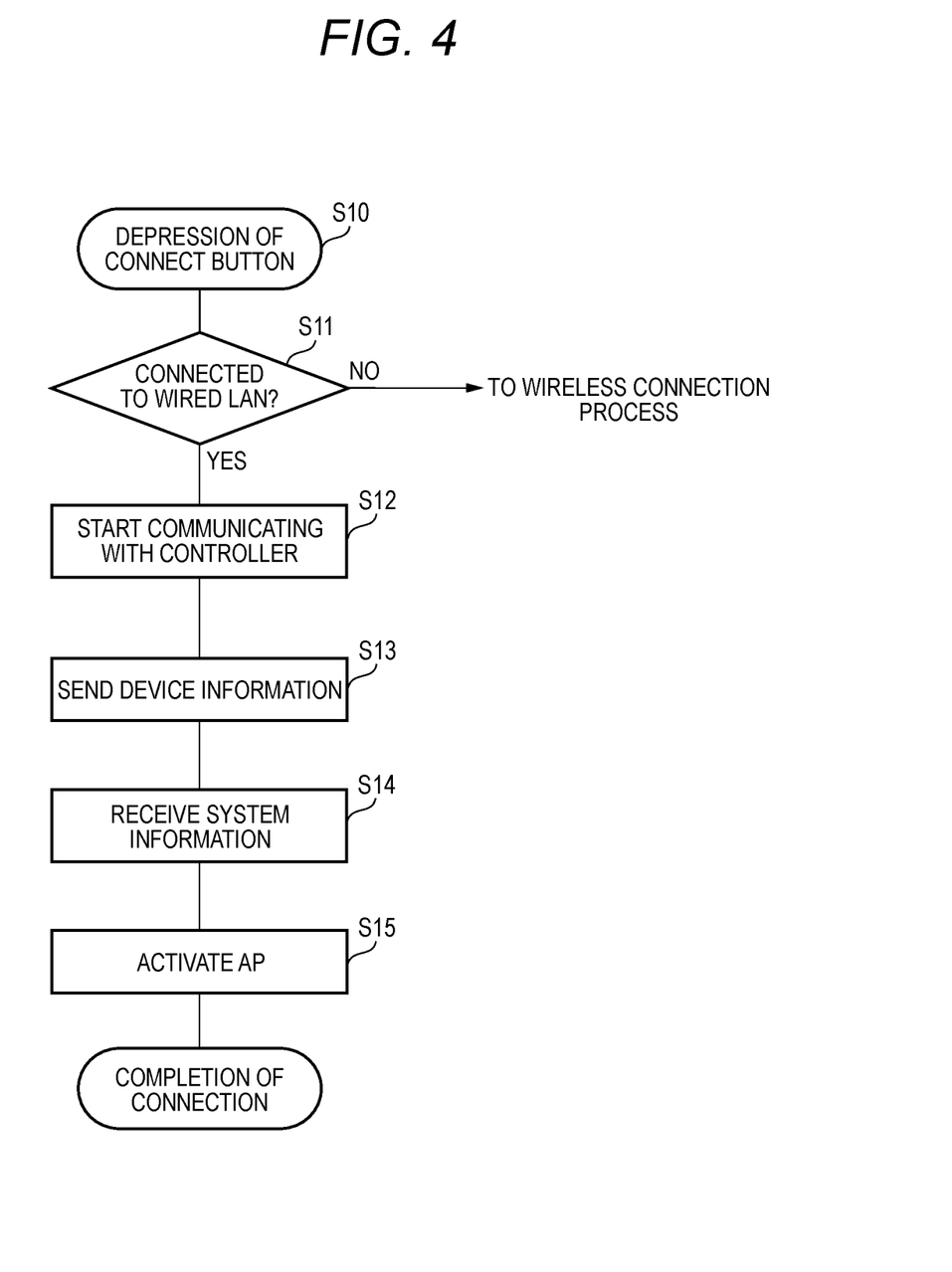
FIG. 4 is a flowchart illustrating an operation that is performed at the time of initial connection of an audio device (root device).

First, an operation (initial connection operation) for connecting a root device, that is, a first-connected audio device 4, will be described with reference to a flowchart of FIG. 4. This process is started as soon as the audio device 4-1 is connected to the wired LAN 2 by a cable and the connect button 59A is depressed in a state that an audio system has not been constructed yet (step S10; in the following, step Sn will be referred to simply as Sn). First, the audio device 4-1 judges whether the audio device 4-1 itself is connected to the wired LAN 2 (S11). If the audio device 4-1 is not connected to the wired LAN 2 (S11: no), the process moves to a wireless connection process shown in FIG. 9.

If the audio device 4-1 is connected to the wired LAN 2 (S11: yes), the audio device 4-1 starts communicating with the controller 1 via the wired LAN 2 and the access point 3 (S12) and sends its own device information to the controller 1 (S13). Receiving the device information, the controller 1 constructs an audio system having the audio device 4-1 as a root device and sends resulting system information to the audio device 4-1. The audio device 4-1 receives the system information from the controller 1 (S14) and starts operating as a device that is part of the audio system. Then the audio device 4-1 activates an internal access point 4A-1 in a stealth mode according to an instruction from the controller 1 (S15).

When the connect button 59A of the audio device 4 is depressed, the user has switched the controller 1 to a setup mode. The setup mode is a mode for constructing and updating an audio system including one or plural audio device 4 and registering them as being under the management of the controller 1.

Figure 5:
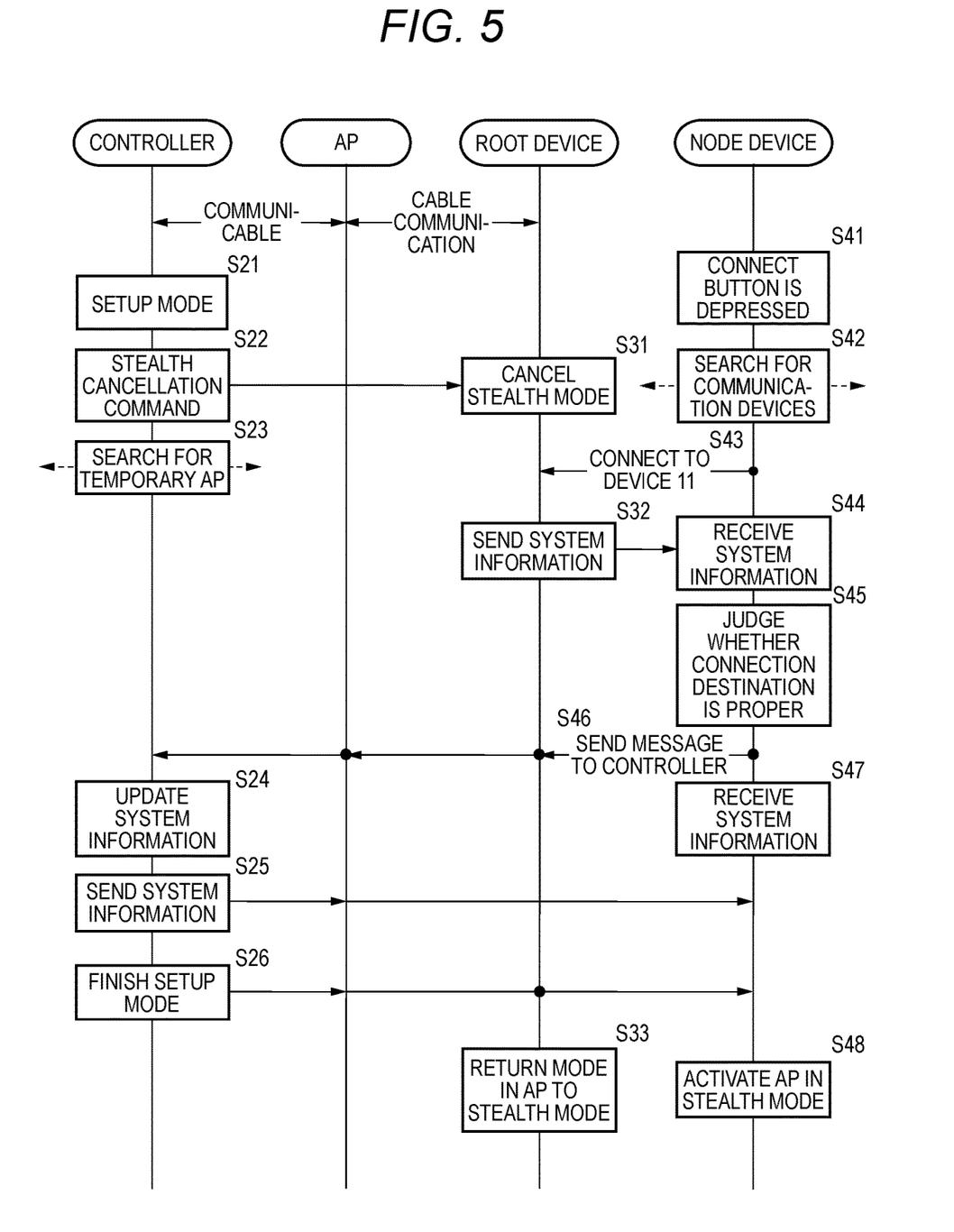
FIG. 5 is a chart illustrating a communication procedure according to which the controller and an audio device communicate with each other.

FIG. 5 is a chart illustrating a communication procedure (of initial connection) according which a second audio device (e.g., audio device 4-2) is connected to the root device 4-1 in a state that an audio system has already been constructed (e.g., a state that the root device 4-1 communicates with the controller 1 and is controlled by the controller 1).

The mobile phone 1 in which the audio system control program 70 has been activated is functioning as the controller 1. When a setup mode is established in the controller 1 in response to a user manipulation (S21), a guide picture that urges the user to depress the connect button 59A of the audio device 4 is displayed on the display unit 41. Guided by this picture, the user depresses the connect button 59A of the audio device 4 (S41). The controller 1 instructs the already registered audio device 4 (root device 4-1) to cancel the stealth mode (S22). In response, the audio device 4-1 cancels the stealth mode of its internal access point and enables access from other device by sending a beacon for announcing its own presence (S31). Then the controller 1 starts a search for an initial connection access point (temporary access point) (S23). However, since the audio device 4-2 does not activate a temporary access point, the controller 1 waits for arrival of a message from the audio device 4-2 by maintaining the search state of S23 (maintaining the wireless LAN connection to the access point 3).

If the user is urged as described above and depresses the connect button 59A of the audio device 4-2 (S41), the audio device 4-2 is rendered in an initial connection mode and searches for a connectable access point (S42). The audio device 4-2 finds a connectable internal access point 4A-1 by the search of S42. As described above, the internal access point 4A-1 has an SSID that allows the audio device 4-2 to recognize that the internal access point 4A-1 is a device belonging to the audio system and the audio device 4-2 can connect to the internal access point 4A-1 by generating a password based on the SSID (or a MAC address). The audio device 4-2 connects to the internal access point 4A-1 (root device 4-1) using this SSID and the generated password (S43). And the audio device 4-2 acquires system information of the audio system from the root device 4-1 (S32 and S44). The system information means information such as a system name, audio device that constitute the system, and their connection form. The audio device 4-2 judges whether the current connection destination is proper based on the system information acquired from the root device 4-1 (S45). Since the current connection destination is the root device 4-1, the audio device 4-2 judges that the current connection destination is proper. As a result, the audio device 4-2 is made a node device 4-2 that is connected to the root device 4-1 from below.

On the other hand, the controller 1 does not find a temporary access point at S23 and is kept connected to the access point 3. As a result, the controller 1 and the audio device 4-2 can communicate with each other via the root device 4-1, the wired LAN 2, and the access point 3. The audio device 4-2 which has been made a node device sends the controller 1 a message to the effect that connection to the network 5 has been completed (S46).

In response, the controller 1 updates the system information of the audio system by registering the audio device 4-2 therein (S24) and sends the latest system information to the audio device 4-1 and 4-2 (S25). Receiving this system information, the audio device 4-2 starts operating as a device of the audio system (S47). After sending the system information to each audio device 4, the controller 1 finishes the setup mode (S26). A setup mode end message is communicated to all the audio device 4 of the audio system. Upon the end of the setup mode, the audio device 4-2 activates the internal access point in a stealth mode (S48). The audio device 4-1 returns the mode of the internal access point 4A-1 to the stealth mode (S33).

Figure 6:
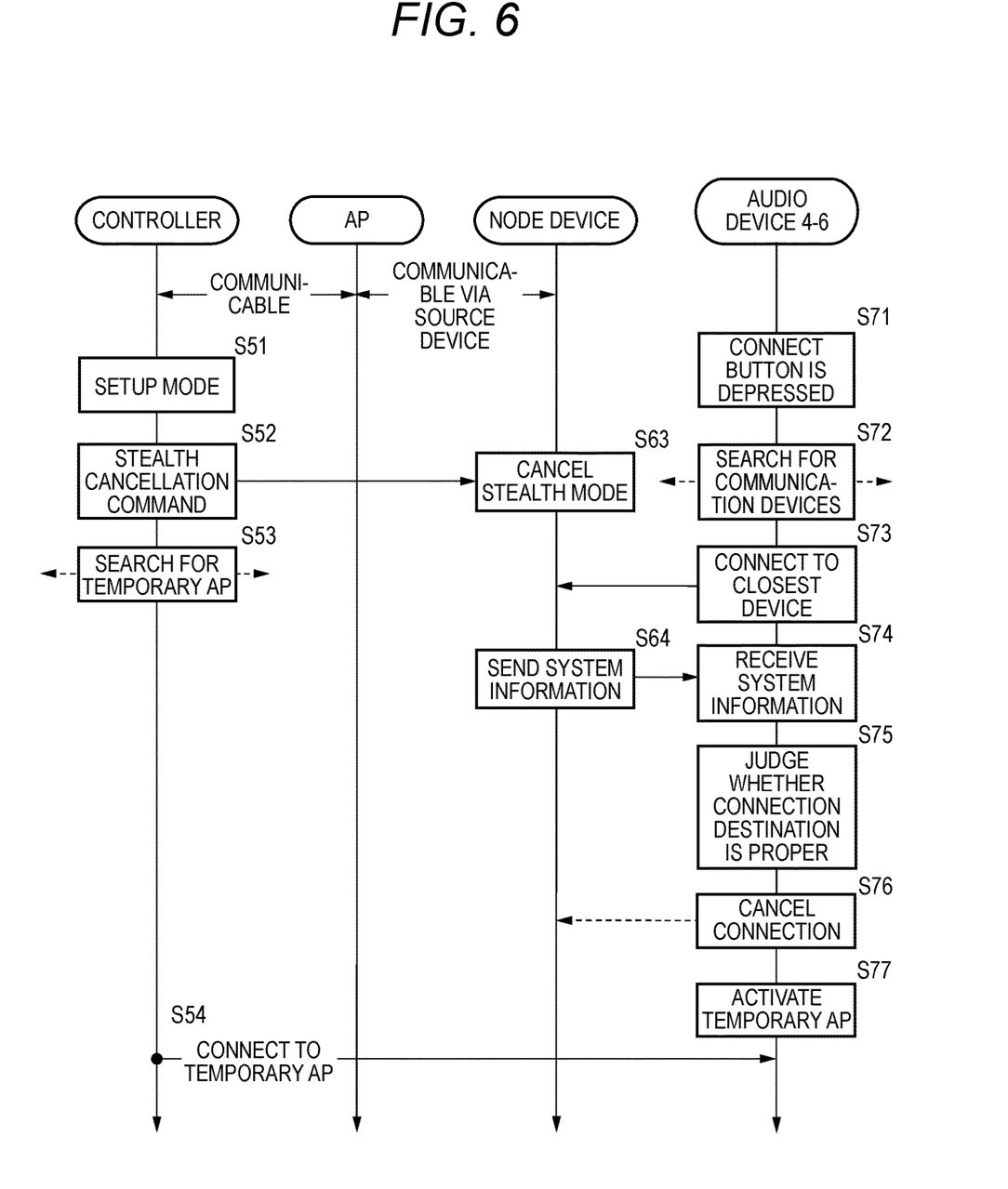
FIG. 6 is a chart illustrating a communication procedure according to which the controller and an audio device communicate with each other.
Figure 7:
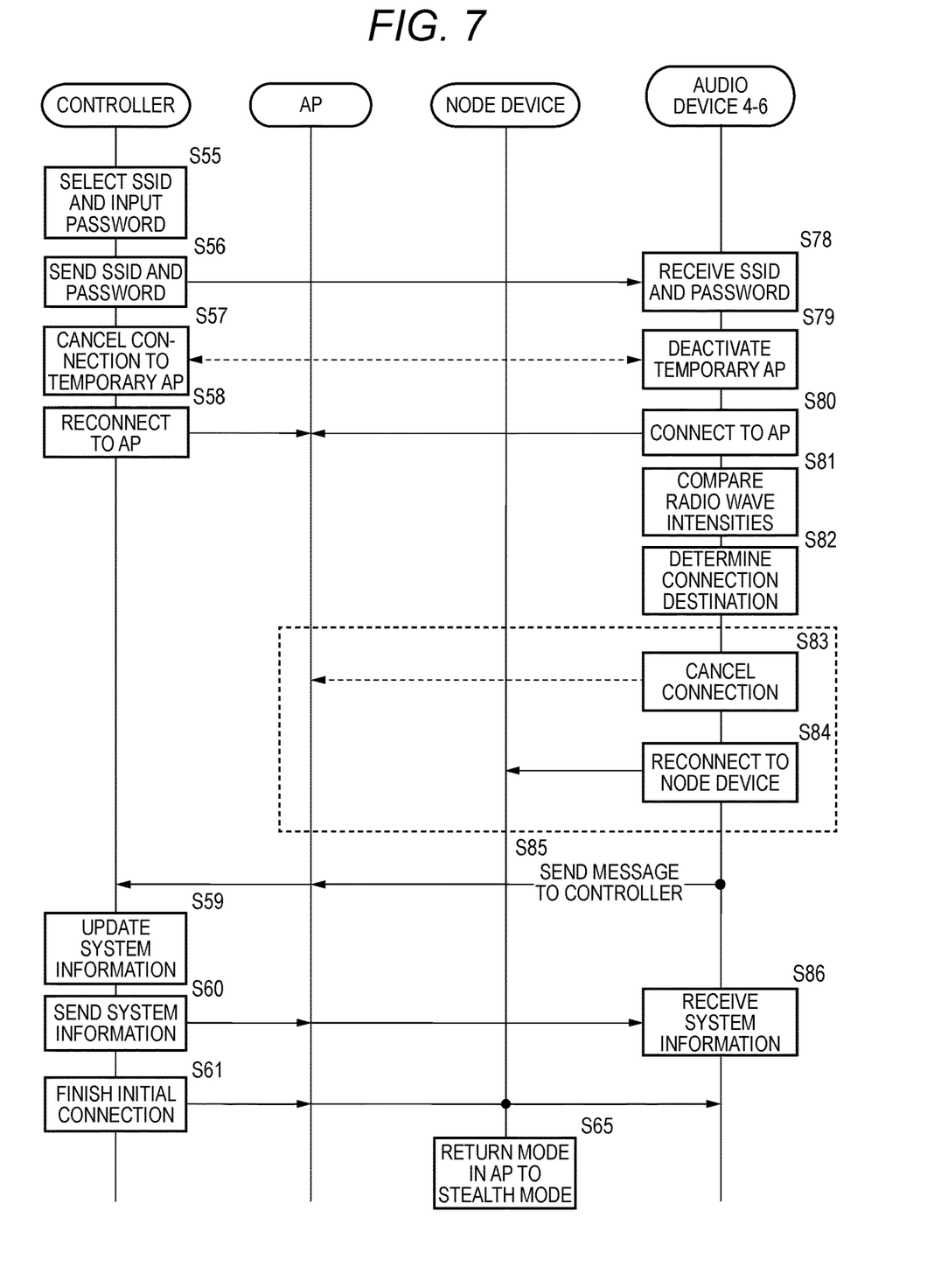
FIG. 7 is another chart illustrating the communication procedure according to which the controller and the audio device communicate with each other.

FIGS. 6 and 7 illustrate a communication procedure according to which a new audio device 4 (e.g., audio device 4-6) is added to and registered in the audio system in a state that an audio system including the root device 4-1 and the node devices 4-2 and 4-3 has already been constructed.

When a setup mode is established in the controller 1 in response to a user manipulation (S51), the controller 1 instructs the already registered audio device 4 to cancel the stealth mode (S52). Each of the audio device 4 including the node device 4-2 cancels the stealth mode in its own internal access point 4A and enables access from other device by sending a beacon for announcing its own presence (S63). Then the controller 1 starts a search for an initial connection access point (temporary access point) (S53). However, since the audio device 4-6 to be newly connected this time does not activate a temporary access point, the controller 1 waits for arrival of a message from the audio device 4-6 by maintaining the search state of S53 (maintaining the wireless LAN connection to the access point 3).

If the user depresses the connect button 59A of the audio device 4-6 (S71) in parallel with rendering the controller 1 into a setup mode. In response, the audio device 4-6 searches for a connectable access point (S72). The audio device 4-6 finds connectable internal access points 4A by the search of S72. In the example of FIG. 1, the internal access points 4A of the root device 4-1 and the node devices 4-2 and 4-3 can be found. The audio device 4-6 connects to the nearest one of these internal access points 4A. As described above, the audio device 4-6 can connect to the internal access point 4A by generating a password on its own. It is assumed here that the audio device 4-6 connects to the internal access point 4A-2 (node device 4-2) (S73). The audio device 4-6 acquires system information of the audio system from the node device 4-2 (S64 and S74). The audio device 4-6 judges whether the current connection destination is proper based on the acquired system information (S75). Since in this case the audio device 4-6 is connected to the node device 4-2 and hence is made a leaf device, the audio device 4-6 judges whether there exists another, higher-level connection destination. Since the two node devices 4-2 and 4-3 are already connected to the root device 4-1, the tree has no available connection point other than a leaf device. Thus, because of this situation, the audio device 4-6 tries to connect to the access point 3.

The audio device 4-6 cancels the connection to the node device 4-2 (S76) and activates a temporary access point only for initial connection in a stand-alone manner (S77). The controller 1 is stored with an SSID and a password of this temporary access point in advance. That is, they are written in the audio system control program 70 as data in advance.

Thus, if finding this temporary access point by the search that was started at S53, the controller 1 temporarily cancels the connection to the access point 3 of the network 5 and connects to the temporary access point activated by the audio device 4-6 (S54). Incidentally, since the temporary access point is activated by the known SSID and password, it may be accessed uselessly. To prevent such an event, it is appropriate to prohibit acceptance of messages other than ones relating to initial connection and thereby prevent improper manipulation (e.g., a manipulation to maximize the volume) of the audio device 4-6. To facilitate access from the controller 1, the temporary access point may be an access point for which no password is set.

A procedure according to which the controller 1 sends connection information of the access point 3 to the audio device 4-6 will be described below. It is highly probable that the controller 1 which is implemented by installing an application program in the mobile phone 1 cannot acquire an SSID and a password of the access point 3 from the system program of the mobile phone 1. Thus, in this process, the controller 1 requests the user to input an SSID and a password of the access point 3 (S55). As for the manner of input of an SSID, it is appropriate to display a list of currently viewable connection destinations (SSIDs) on the display and has the user select an SSID of the access point 3. The controller 1 has the user input a password (usually written on the body of the access point 3). The controller 1 sends the input connection information to the audio device 4-6 which is connected as the temporary access point (S56). The audio device 4-6 receives this connection information (S78).

After sending the connection information (SSID and PW) of the access point 3 to the audio device 4, the controller 1 cancels the connection to the initial connection access point (S57). In parallel with this operation, when receiving the connection information of the access point 3, the audio device 4-6 deactivates the initial connection access point (S79).

At S58, the controller 1 reconnects to the access point 3 the connection to which was canceled at S54. The audio device 4-6 also connects to the access point 3 using the acquired connection information (S80). In this state, the audio device 4-6 compares a radio wave intensity of the access point 3 and a radio wave intensity of the node device 4-2 to which the audio device 4-6 was connected at S53. If the radio wave intensity of the access point 3 is lower than a prescribed value and the radio wave intensity of the node device 4-2 is sufficiently higher than that of the access point 3, the audio device 4-6 cancels the connection to the access point 3 (S83) and reconnects to the internal access point 4A-2 of the node device 4-2 (S84). If the radio wave intensity of the access point 3 is higher than or equal to the prescribed value, S83 and S84 are not executed and the audio device 4-6 maintains the connection to the access point 3. Although in this process to which of the two access points connection should be made is judged by comparing radio wave intensities of these access points, this judgment may be made by comparing communication speeds, the degrees of communication stability, or the like. As a further alternative, this judgment may be made based on results of comparisons of plural factors.

Because of the execution of the above steps, the audio device 4-6 is rendered communicable with the controller 1 via the access point 3 or the node device 4-2. The audio device 4-6 sends the controller 1 a message to the effect that connection to the network 5 has been completed (S85). The controller 1 registers the audio device 4-6 in the system information of the audio system (i.e., updates the system information) (S59), and sends the latest system information to each audio device 4 (S60). Receiving this system information, the audio device 4-6 starts operating as a device (branch device or leaf device) of the audio system (S86). After sending the system information to each audio device 4, the controller 1 finishes the setup mode (S61). A setup mode end message is communicated to all the audio device 4 of the audio system. Upon the end of the setup mode, the audio device 4-2 returns the mode of its internal access point 4A-2 to the stealth mode (S65).

As described above, in the audio system, two or less audio device 4 can be connected to each of the root device 4-1 and the node device 4-2 and 4-3. However, in the case of connection (S73) for acquiring system information in an initial connection operation, the root device 4-1 or the node device 4-2 or 4-3 accepts a connection request from the new audio device 4 even if it is a third audio device 4. In this case, since the new audio device 4 cannot be registered in the system information of the audio system as being connected to this connection destination, the new audio device 4 necessarily needs to search for another connection destination.

The procedures according to which the controller 1 and the audio device 4 communicate with each other in initial connection of an audio device 4 have been described above. Next, how the control units of the controller 1 and an audio device 4 operate will be described with reference to flowcharts of FIGS. 8 and 9.

Figure 8:
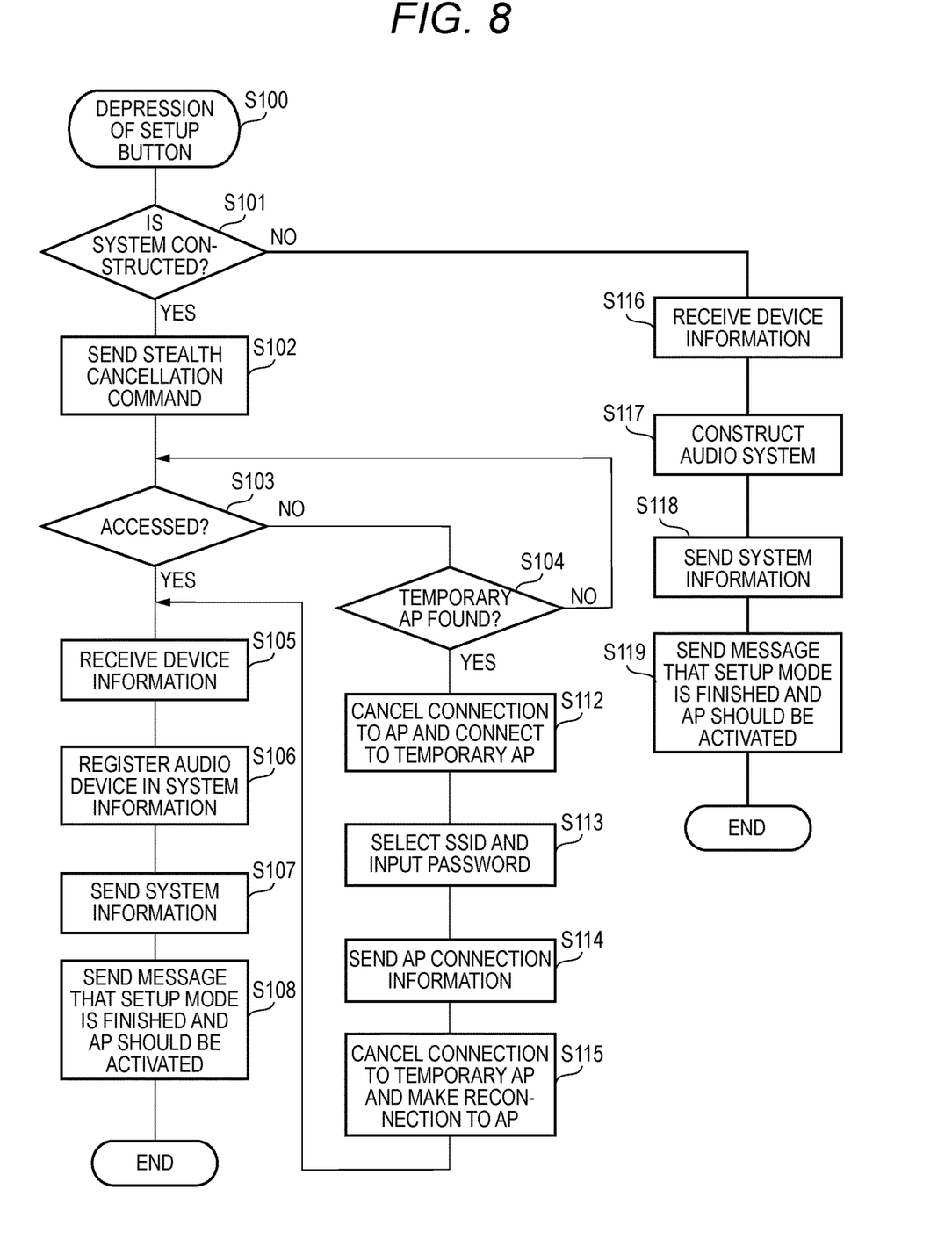
FIG. 8 is a flowchart illustrating how the controller operates in a setup mode.

FIG. 8 is a flowchart illustrating a process that is executed by the control unit 20 of the controller 1 when it is in a setup mode. As soon as the user depresses a setup button, a setup mode is activated (S100) and this process is started. First, the control unit 20 displays, on the display unit 41, a guide picture for urging the user to depress the connect button of a new audio device 4, and then judges whether an audio system has already been constructed by referring to an audio system table 231 (S101). If an audio system has already been constructed (S101: yes), the control unit 20 sends, to the audio device 4 belonging to the audio system, a command message instructing them to cancel the stealth mode (S102). If an audio system has not been constructed yet, the process moves to S116.

Then the control unit 20 monitors whether it receives access from a new audio device 4 via the network 5 (S103) and whether an initial connection access point (temporary access point) is found (S104).

If receiving access from a new audio device 4 via the network 5 (S103: yes), the control unit 20 receives device information from the new audio device 4 (S105) and registers the device information received this time in the system information of the constructed audio system (S106). Then the control unit 20 sends the updated system information to all of the audio device 4 belonging to the audio system (S107). After the execution of this step, the control unit 20 sends a message to the effect that it is going to finish the setup mode and the internal access point should be activated in a stealth mode (S108) and finishes the setup mode.

If finding a temporary access point (S104: yes), the control unit 20 cancels the wireless LAN connection to the access point 3 and makes connection to the temporary access point (S112). Then the control unit 20 displays, on the display unit 41, a picture for selection of an SSID of the access point 3 from viewable SSIDs in the wireless LAN communication circuit 32 and a picture for input of a password of the access point 3 and thereby urges the user to select an SSID and input its password (S113). The control unit 20 sends the input SSID and password (router information) to the audio device 4 that has activated the temporary access point (S114). Subsequently, the control unit 20 cancels the connection to the temporary access point and makes reconnection to the router 2 (S115). The process thereafter moves to S105 to receive device information of the audio device 4.

On the other hand, if judging at S101 that an audio system has not been constructed yet (S101: no), which means that the first audio device 4 is a root device and is connected directly to the wired LAN 2, the control unit 20 receives device information from the new audio device 4 via the wired LAN 2 and the access point 3 (S116) and constructs an audio system having this audio device 4 as a root device (S117). Then the control unit 20 sends the system information of the constructed audio system to the root device (S118). After executing this step, the control unit 20 sends a message to the effect that it is going to finish the setup mode and the internal access point should be activated in a stealth mode (S119) and finishes the setup mode process.

Figure 9:
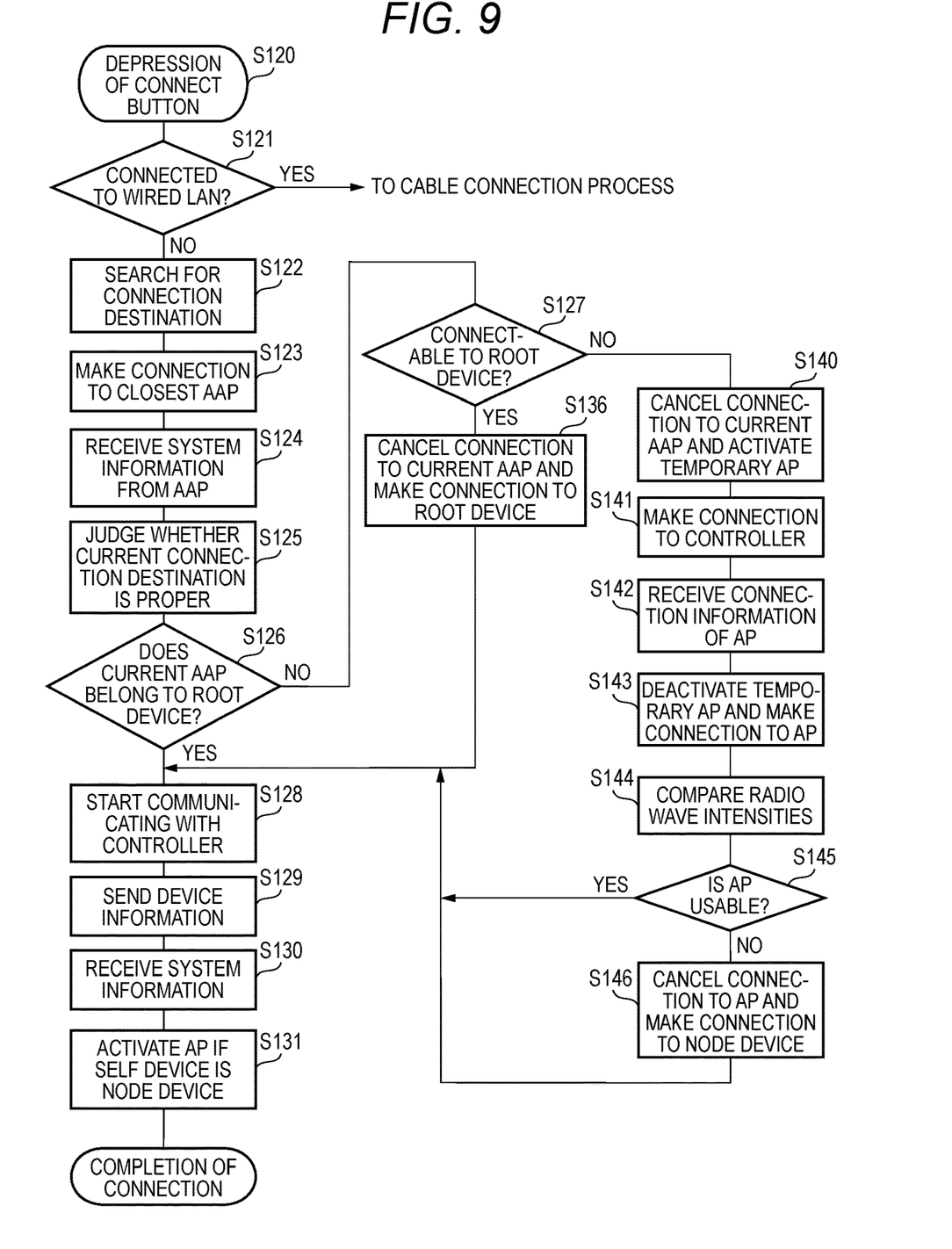
FIG. 9 is a flowchart illustrating how an audio device operates at the time of initial connection.

FIG. 9 is a flowchart illustrating an operation that is executed by the control unit 50 of an audio device 4 at the time of initial connection. The process is started upon depression of the connect button (S120). First, the control unit 50 judges whether the audio device 4 to which the control unit 50 belongs is connected to a network 5 via the wired LAN 2 (S121). If the audio device 4 is connected to a network 5 via the wired LAN 2 (S121: yes), the process moves to a cable connection process. If the audio device 4 is connected to the wired LAN 2 as a root device in a state that an audio system is not constructed yet, the process of FIG. 4 is executed. S128 and the following steps of this flowchart are executed if an audio system is already constructed.

If the audio device 4 is not connected to the wired LAN 2 (S121: no), the control unit 50 activates the wireless LAN communication unit 56 and searches for a wireless LAN connection destination (access point) (S122). It is assumed here that the internal access point 4A (denoted by AAP in the figure) of a root device or a node device is found. First, the control unit 50 connects the audio device 4 to a closest internal access point 4A (S123). It is appropriate that the closest internal access point to which connection should be made be an internal access point that provides a highest radio wave intensity. The control unit 50 receives system information from this internal access point 4A (audio device 4) (S124). The control unit 50 judges, based on the received system information, whether it is proper to employ, as a connection destination, the internal access point 4A to which connection is made currently (S125, S126, and S127).

If the internal access point 4A to which connection is made currently is the internal access point 4A of a root device, the control unit 50 judges that this connection is proper because a sufficiently high audio signal transmission speed is expected (S126: yes) and executes a device registration process (S128-S131), which will be described below. The audio device 4 starts communicating with the controller 1 over the network 5 (S128) and sends device information to the controller 1 (S129). The controller 1 returns system information that has been updated to incorporate this device information. The audio device 4 receives this system information (S130). If the self device 4 is a node device of the audio system, the control unit 50 activates the internal access point 4A (S131).

On the other hand, if the internal access point 4A to which connection is made currently is not the internal access point 4A of a root device, that is, it is the internal access point 4A of a node device (S126: no), the control unit 50 judges whether connection to the internal access point 4A of a root device is possible (S127). "Being connectable to the internal access point 4A of a root device" means that the number of node devices that are connected to the root device 4-1 is smaller than two and the internal access point 4A-1 of the root device 4-1 is being detected at such a radio wave intensity that this audio device 4 can communicate with it. If connection to the internal access point 4A of a root device is possible (S127: yes), the control unit 50 cancels the connection to the internal access point 4A-1 to which connection is made currently and makes new connection to the internal access point 4A of the root device (S136). Then the control unit 50 executes the device registration process (S128-S131).

If the internal access point 4A to which connection is made currently is not the internal access point 4A of a root device and connection to the internal access point 4A of a root device is impossible (S127: no), the control unit 50 tries to make connection to the access point 3 which is connected to the wired LAN 2. Since information of the access point 3 cannot be acquired from the node device to which connection is made currently, the control unit 50 cancels the connection to the internal access point 4A to which connection is made currently and activates the temporary access point using the wireless LAN communication unit 57 (S140). The control unit 50 makes connection to the controller 1 that has accessed the temporary access point (S141) and receives connection information of the access point 3 from the controller 1 (S142). Then the control unit 50 deactivates the temporary access point and makes connection to the access point 3 using the acquired connection information (S143).

The audio device 4 connects to the access point 3, and compares a resulting radio wave intensity with a radio wave intensity of the internal access point 4A of the first-connected node device 4 (S144). If the radio wave intensity of the access point 3 is higher than or equal to a prescribed value, the control unit 50 judges that communication using the access point 3 is possible. Even if the radio wave intensity of the access point 3 is lower than the prescribed value, the control unit 50 selects the access point 3 if it is not lower, by a second prescribed value, than the radio wave intensity of the internal access point 4A of the node device 4 to which connection was made previously. If the access point 3 is selected as a connection destination, the control unit 50 makes an affirmative judgment at S145 and moves to the device registration process (S128 and the following steps). If the internal access point 4A of the node device 4 to which connection was made previously is selected, the control unit 50 makes a negative judgment at S145 and moves to S146. At S146, the control unit 50 cancels the connection to the access point 3 and makes reconnection to the internal access point 4A of the node device 4 (S146). Then the process moves to the device registration process (S128 and the following steps). If the process moves to S128 from S145 or S146, the audio device 4 is made a branch device or a leaf device and hence its internal access point 4A is not activated at S131.

A radio wave intensity comparison process that is similar to S144-146 may be executed when connection switching is made from the internal access point 4A of the node device 4 to that of the root device 4 at S136.

The audio device of this disclosure may be replaced by audio-video (AV) device having a video reproduction function, and the disclosure encompasses a system that includes audio device and audio-video device in mixture. In the case of audio-video device, video signals are exchanged over the network 5 in addition to audio signals. Although in the embodiment the control terminal device is implemented as the mobile phone 1 in which the audio system control program 70 (application program) is installed, it may have another configuration. For example, it may be a tablet terminal in which the audio system control program 70 is installed or a dedicated terminal device.

The embodiment of this disclosure will now be summarized below:

(1) This disclosure provides a connection method of a communication device in a communication system that includes a plurality of communication devices each having a wireless LAN (Local Area Network) access point function and a wireless LAN child device function and is constructed by connecting a lower-level communication device to an access point of a higher-level communication device, wherein a new communication device to be added to the communication system executes a first step of connecting to an access point of an arbitrary one of the plurality of communication devices of the communication system; and a second step of acquiring, from the connected communication device, system information of the communication system including a connection form of the plurality of communication devices.

(2) The connection method according to item (1), wherein, for example, the new communication device to be added to the communication system executes a third step of changing a connection destination of the new communication device to an access point of a high-level communication device being higher in hierarchy of the communication system than the arbitrary one of the plurality of communication devices based on the acquired system information.

(3) The connection method according to item (1), wherein, for example, a highest-level communication device of the communication system is connected to a wired LAN, and an external access point that is an access point of the wireless LAN is connected to the wired LAN, and the new communication device executes a fourth step of changing the connection destination of the new audio device to the external access point based on the acquired system information.

(4) The connection method according to item (3), wherein, for example, the fourth step includes a step that the new communication device activates its own access point in a stand-alone manner; a step that a communication device (control terminal device) cancels a connection to the external access point and then connects to the access point of the new communication device; a step that the communication device (control terminal device) sends the new communication device connection information that is information for connection to the external access point, and then the new communication device receives the connection information; a step that the new communication device deactivates the stand-alone access point thereof; and a step that the new communication device connects to the external access point using the received connection information.

(5) The connection method according to item (3) or (4), wherein, for example, after executing the fourth step the new communication device compares a communication state of the external access point and a communication state of the arbitrary communication device; and changes the connection destination of the new communication device again (or returns the connection destination) to the access point of the arbitrary communication device when a comparison result indicates a prescribed state.

(6) The connection method according to any one of items (3) to (5), wherein, for example, a prescribed number of lower-level communication device is connectable to its own access point of each of the plurality of communication devices, and based on the system information, the new communication device changes the connection destination thereof to an access point of a higher-level communication device when the number of lower-level communication device connected to the access point of the higher-level communication device is smaller than the prescribed number, and changes the connection destination thereof to the external access point when the number of lower-level communication device is already connected to the access point of the higher-level communication device.

(7) The connection method according to any one of items (1) to (6), wherein, for example, the communication devices are audio device.

(8) A communication device of a communication system that includes a plurality of communication devices each having a wireless LAN (Local Area Network) access point function and a wireless LAN child device function and is constructed by connecting a lower-level communication device to an access point of a higher-level communication device, including a wireless network communication unit that communicates with another communication device in the communication system over a wireless network; a communication processing unit that processes a communication signal received from the wireless network; and a control unit, wherein: the control unit makes connection to an arbitrary access point by searching the wireless network, acquires connection form of the plurality of communication devices in the wireless network from the connected access point, and changes a connection destination thereof to another access point based on the acquired connection form.

(9) The communication device according to item (8), wherein, for example, the control unit changes the connection destination thereof to an access point of a high-level communication device being higher in hierarchy of the communication system than the arbitrary one of the plurality of communication devices based on the acquired connection form.

(10) The communication device according to item (8), wherein, for example, a highest-level communication device of the communication system is connected to a wired LAN, and an external access point that is an access point of the wireless LAN is connected to the wired LAN, and the control unit changes the connection destination thereof to the external access point based on the acquired connection form.

(11) The communication device according to item (10), wherein, for example, the control unit activates, in a stand-alone manner, an access point of the communication device in which the control unit is included, when the other communication device cancels a connection to the external access point and connects to the wireless network communication unit, the wireless network communication unit receives, from the other communication device, connection information that is information for connection to the external access point, and the control unit deactivates the stand-alone access point of the communication device, and makes connection to the external access point using the received connection information.

(12) The communication device according to item (11), wherein, after connecting to the external access point using the received connection information, the control unit compares a communication state of the external access point and a communication state of the arbitrary communication device in the plurality of communication devices, and changes the connection destination of the communication device to the access point of the arbitrary communication device when a comparison result indicates a prescribed state.

(13) The communication device according to any one of item (10) to (12), wherein, for example, a prescribed number of lower-level communication device is connectable to its own access point of each of the plurality of communication devices, and based on the connection form, the control unit changes the connection destination of the communication device to an access point of a higher-level communication device when the number of lower-level communication device connected to the access point of the higher-level communication device is smaller than the prescribed number, and changes the connection destination thereof to the external access point when the prescribed number of lower-level communication device is already connected to the access point of the higher-level communication device.

(14) The communication device according to any one of items (8) to (13), wherein the communication devices are audio device.

This disclosure is useful because it makes it possible to connect a new communication device to a network easily in an efficient form.

What is claimed is:

1. A connection method of communicating a new audio device with a communication system, the method comprising:
   constructing the communication system, which includes an external access point of a wireless LAN (Local Area Network) connected to a wired LAN and a plurality of audio devices each including a wireless LAN access point function and a wireless LAN child device function, at least one of the plurality of audio devices being a highest-level communication device, by:
   connecting one audio device that is the highest-level communication device, among the plurality of audio devices, to the external access point via the wired LAN; and
   connecting another audio device, among the plurality of audio devices, to an access point of the one audio device;
   connecting the new audio device to an access point of the another audio device;
   acquiring, from the access point of the another audio device, system information of the communication system including a connection form of the plurality of audio devices; and
   automatically changing a connection destination of the new audio device from the access point of the another audio device to the external access point based on the acquired system information, wherein the new audio device:
   activates its own access point as a stand-alone access point;
   connects to a controller, after the controller cancels the connection of the new device to the external access point;
   receives, from the controller, connection information for connecting to the external access point;
   deactivates the stand-alone access point; and
   connects to the external access point using the received connection information.

2. The connection method according to claim 1, wherein after executing the automatically changing of the connection destination, the method further comprises the new communication device:
   comparing a communication state of the external access point and a communication state of the another audio device; and
   changing the connection destination of the new audio device again to the access point of the another audio device when a comparison result indicates a prescribed state.

3. The connection method according to claim 1, wherein:
   a prescribed number of lower-level audio devices is connectable to its own access point of each of the plurality of audio devices, and
   based on the system information, the new audio device changes the connection destination thereof to:
   an access point of a higher-level audio device when the number of lower-level audio devices connected to the access point of the higher-level audio device is smaller than the prescribed number;
   the external access point when the number of lower-level audio devices is already connected to the access point of the higher-level audio device.

4. An audio device connectable to a communication system that includes an external access point of a wireless LAN (Local Area Network) connected to a wired LAN and a plurality of audio devices each including a wireless LAN access point function and a wireless LAN child device function, at least one of the plurality of audio devices being a highest-level communication device, the communication system being constructed by connecting one audio device that is the highest-level communication device, among the plurality of audio devices, to the external access point via the wired LAN, and connecting another audio device, among the plurality of audio devices, to an access point of the one audio device, the audio device comprising:
   a wireless network communication interface that includes the wireless LAN access point function and the wireless LAN child device function, and communicates with another audio device in the communication system over a wireless network; and
   a processor configured to implement stored instructions and execute a plurality of tasks, including:
   a communication processing task that processes a communication signal received from the wireless network;
   a connecting task that connects to an access point of the another audio device by searching the wireless network;
   an acquiring task that acquires, from the access point of the another audio device to which the communication device is connected to, system information of the communication system including connection form of the plurality of audio devices; and
   a connection destination changing task that automatically changes a connection destination of the audio device from the access point of the another audio device to the external access point based on the acquired system information, wherein the connection destination changing task:
   activates its own access point as a stand-alone access point;
   connects to a controller, after the controller cancels the connection of the audio device to the external access point;
   receives, from the controller via the wireless network communication interface, connection information for connecting to the external access point;
   deactivates the stand-alone access point; and connects to the external access point using the received connection information.

5. The audio device according to claim 4, wherein, after connecting to the external access point using the received connection information, the connection destination task:
compares a communication state of the external access point and a communication state of the another audio device; and
changes the connection destination of the audio device to the access point of the another audio device when a comparison result indicates a prescribed state.

6. The audio device according to claim 4, wherein:
a prescribed number of lower-level audio devices is connectable to its own access point of each of the plurality of audio devices, and
based on the system information, the connection destination changing task changes the connection destination of the audio device to:
an access point of a higher-level audio device when the number of lower-level audio devices connected to the access point of the higher-level audio device is smaller than the prescribed number; and
the external access point when the prescribed number of lower-level audio devices is already connected to the access point of the higher-level audio device.

* * * * *